United States Patent
Fujisaki et al.

(10) Patent No.: US 11,005,109 B2
(45) Date of Patent: *May 11, 2021

(54) ELECTROCHEMICAL CELL INCLUDING CATHODE WITH MAIN PHASE OF PEROVSKITE OXIDE AND SECOND PHASE OF $CO_3O_4$ AND $(CO,FE)_3O_4$

(71) Applicant: NGK INSULATORS, LTD., Nagoya (JP)

(72) Inventors: Shinji Fujisaki, Kuwana (JP); Takashi Ryu, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 111 days.

This patent is subject to a terminal disclaimer.

(21) Appl. No.: 16/210,455

(22) Filed: Dec. 5, 2018

(65) Prior Publication Data

US 2019/0115599 A1 Apr. 18, 2019

Related U.S. Application Data

(63) Continuation of application No. PCT/JP2017/027098, filed on Jul. 26, 2017.

(30) Foreign Application Priority Data

Jul. 27, 2016 (JP) .............................. JP2016-147861

(51) Int. Cl.
*H01M 4/90* (2006.01)
*H01M 4/86* (2006.01)
(Continued)

(52) U.S. Cl.
CPC ........... *H01M 4/9033* (2013.01); *H01M 4/86* (2013.01); *H01M 8/12* (2013.01); *H01M 2004/8689* (2013.01); *H01M 2008/1293* (2013.01)

(58) Field of Classification Search
CPC .............................. H01M 4/9033; H01M 4/86
(Continued)

(56) References Cited

U.S. PATENT DOCUMENTS

2012/0270139 A1 10/2012 Park et al.
2013/0095410 A1 4/2013 Ohmori et al.
(Continued)

FOREIGN PATENT DOCUMENTS

| JP | 2006-032132 A | 2/2006 |
| JP | 2012-227142 A | 11/2012 |
| JP | 2014-116072 A | 6/2014 |
| JP | 2014-207146 A | 10/2014 |

OTHER PUBLICATIONS

Japanese International Search Report and Written Opinion for corresponding PCT/JP2017/027098 (8 pgs).
(Continued)

*Primary Examiner* — Sean P Cullen
(74) *Attorney, Agent, or Firm* — Flynn Thiel, P.C.

(57) ABSTRACT

The electrochemical cell has an anode, a cathode, and a solid electrolyte layer disposed between the anode and the cathode. The cathode contains a main phase which is configured by a perovskite oxide expressed by the general formula $ABO_3$ and including at least one of La or Sr at the A site, and a second phase which is configured by $Co_3O_4$ and $(Co, Fe)_3O_4$. An occupied surface area ratio of the second phase in a cross section of the cathode is less than or equal to 10.5%.

2 Claims, 1 Drawing Sheet

(51) Int. Cl.
*H01M 8/12* (2016.01)
*H01M 8/124* (2016.01)

(58) Field of Classification Search
USPC .......................................... 429/489
See application file for complete search history.

(56) References Cited

U.S. PATENT DOCUMENTS

| | | | |
|---|---|---|---|
| 2015/0349349 A1 | 12/2015 | Ohmori et al. | |
| 2017/0025684 A1* | 1/2017 | Fujisaki | H01M 4/9033 |
| 2017/0054153 A1* | 2/2017 | Ohmori | H01M 8/1253 |
| 2017/0062837 A1* | 3/2017 | Ohmori | C04B 35/01 |
| 2017/0062838 A1* | 3/2017 | Ohmori | C04B 35/2633 |
| 2018/0102551 A1* | 4/2018 | Ohmori | H01M 8/1253 |
| 2018/0123156 A1* | 5/2018 | Ohmori | H01M 4/8636 |
| 2018/0138521 A1* | 5/2018 | Ohmori | C04B 35/2641 |
| 2019/0109328 A1* | 4/2019 | Fujisaki | C04B 35/2641 |

OTHER PUBLICATIONS

English International Search Report for corresponding PCT/JP2017/027098 (1 pg).
U.S. Appl. No. 16/210,432, filed Dec. 5, 2018.
English translation of International Preliminary Report on Patentability issued in PCT/JP2017/027098, dated Feb. 7, 2019 (2 pgs.).
English translation of Written Opinion of the International Searching Authority issued in PCT/JP2017/027098, dated Sep. 5, 2017 (5 pgs.).

* cited by examiner

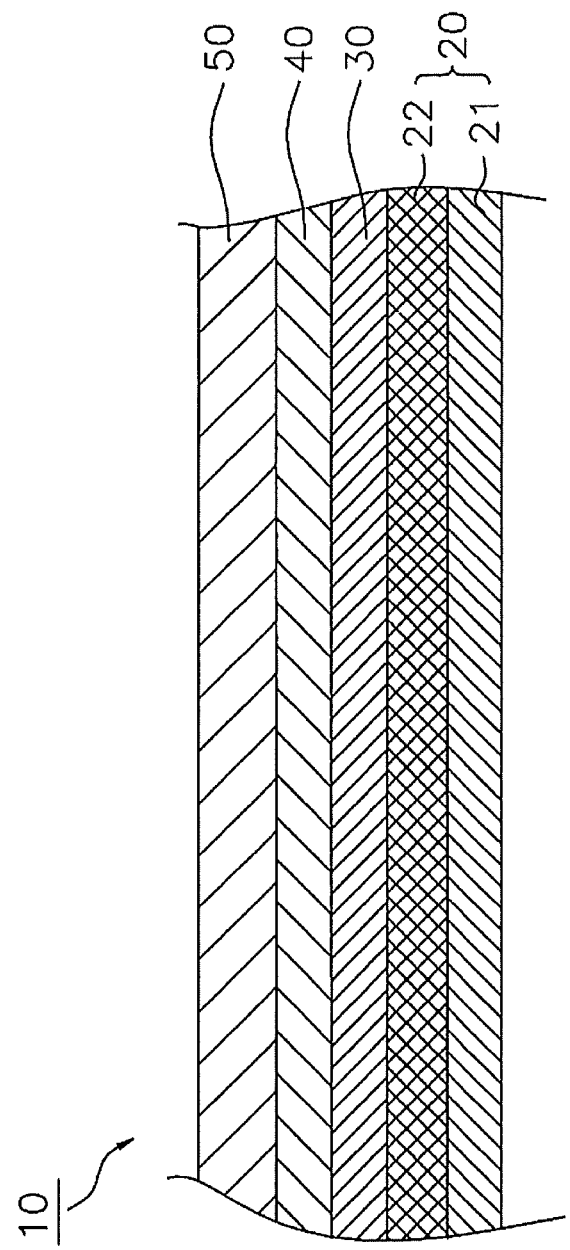

ELECTROCHEMICAL CELL INCLUDING CATHODE WITH MAIN PHASE OF PEROVSKITE OXIDE AND SECOND PHASE OF $Co_3O_4$ AND $(Co,Fe)_3O_4$

CROSS-REFERENCE TO RELATED APPLICATIONS

This application is a continuation application of PCT/JP2017/027098, filed Jul. 26, 2017, which claims priority to Japanese Application no. 2016-147861, filed Jul. 27, 2016, the entire contents all of which are incorporated hereby by reference.

TECHNICAL FIELD

The present invention relates to an electrochemical cell.

BACKGROUND ART

In recent years, fuel cells that are a type of electrochemical cell have attracted attention in light of environmental problems and their effective use as an energy source.

A fuel cell generally includes an anode, a cathode, and a solid electrolyte layer disposed between the anode and the cathode.

The cathode for example is configured by a perovskite oxide such as (La, Sr)(Co, Fe)$O_3$:(lanthanum strontium cobalt ferrite) or the like (for example, reference is made to Japanese Patent Application Laid-Open No. 2006-32132).

SUMMARY OF INVENTION

However, fuel cell output may be reduced by repetitive power generation. The present inventors have gained the new insight that one cause of a reduction in output results from deterioration of the cathode, and that such deterioration of the cathode is related to the total proportion of $Co_3O_4$ and $(Co, Fe)_3O_4$ that is introduced into the cathode.

The present invention is proposed based on the new insight above, and has the object of providing an electrochemical cell that is configured to inhibit a reduction in the fuel cell output.

The electrochemical cell according to the present invention has an anode, a cathode, and a solid electrolyte layer disposed between the anode and the cathode. The cathode contains a main phase which is configured by a perovskite oxide expressed by the general formula $ABO_3$ and including at least one of La or Sr at the A site, and a second phase which is configured by $Co_3O_4$ and $(Co, Fe)_3O_4$. An occupied surface area ratio of the second phase in a cross section of the cathode is less than or equal to 10.5%.

The present invention provides an electrochemical cell that is configured to inhibit a reduction in the fuel cell output.

BRIEF DESCRIPTION OF DRAWINGS

The FIGURE is a cross sectional view illustrating a configuration of a fuel cell.

DESCRIPTION OF EMBODIMENTS

Configuration of Fuel Cell 10

The configuration of the fuel cell 10 will be described making reference to the drawing. The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, a cylindrical type, or the like.

The FIGURE is a cross sectional view illustrating a configuration of a fuel cell 10. The fuel cell 10 includes an anode 20, a solid electrolyte layer 30, a barrier layer 40, and a cathode 50.

The anode 20 functions as an anode for the fuel cell 10. As illustrated in the FIGURE, the anode 20 includes an anode current collecting layer 21 and an anode active layer 22.

The anode current collecting layer 21 is configured as a porous body that exhibits a superior gas permeability. The material that constitutes the anode current collecting layer 21 includes the use of a material that is used in the anode current collecting layer of a conventional SOFC, and for example, includes NiO (nickel oxide)-8YSZ (8 mol % of yttria-stabilized zirconia), or NiO—$Y_2O_3$ (yttria). However, when NiO is included in the anode current collecting layer 21, at least a portion of the NiO may be reduced to Ni during the operation of the fuel cell 10. The thickness of the anode current collecting layer 21 may be configured, for example, as 0.1 mm to 5.0 mm.

The anode active layer 22 is disposed on the anode current collecting layer 21. The anode active layer 22 is configured as a porous body that is denser than the anode current collecting layer 21. The constituent material for the anode active layer 22 includes the use of a material used in an anode active layer of a conventional SOFC and, for example, includes NiO-8YSZ. However, when NiO is included in the anode active layer 22, at least a portion of the NiO may be reduced to Ni during the operation of the fuel cell 10. The thickness of the anode active layer 22 may be configured for example as 5.0 μm to 30 μm.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable the permeation of oxide ions that are produced by the cathode 50. The solid electrolyte layer 30 is configured by a material that is denser than the anode 20 or the cathode 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mol composition ratio (stabilizing agent:zirconia) of the stabilizing agent to zirconia in the solid electrolyte layer 30 may be configured to be approximately 3:97~20:80. Therefore, the material used in the solid electrolyte layer 30 includes 3YSZ, 8YSZ, 10YSZ, or ScSZ (zirconia stabilized with scandia), or the like. The thickness of the solid electrolyte layer 30 for example may be configured as 3 μm to 30 μm.

In the present embodiment, the term composition "X contains as a main component composition Y" means that composition Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits the formation of a high resistivity layer between the solid electrolyte layer 30 and the cathode 50. The barrier layer 40 is configured by a material that is denser than the anode 20 or the cathode 50. The barrier layer 40 may include a main component of a ceria-based material such as GDC (gadolinium-doped ceria), SDC (samarium-doped ceria), or the like. The thickness of the barrier layer 40 may be configured, for example, as 3 µm to 20 µm.

The cathode 50 is disposed on the barrier layer 40. The cathode 50 functions as a cathode for the fuel cell 10. The cathode 50 is configured as a porous body. There is no particular limitation on the porosity of the cathode 50, and it may be configured to be 20% to 60%. There is no particular limitation on the thickness of the cathode 50 and it may be configured to be 2 µm to 100 µm.

The cathode 50 contains a main phase configured by a perovskite oxide expressed by the general formula $ABO_3$ and including at least one of La or Sr at the A site. The perovskite oxide for example may suitably employ a composite perovskite oxide that contains lanthanum, or SSC (samarium strontium cobaltite (Sm, Sr)$CoO_3$) or the like that does not contain lanthanum. However, there is no limitation in this regard. The lanthanum-containing composite perovskite oxide includes LSCF (lanthanum strontium cobalt ferrite): (La, Sr)(Co, Fe)$O_3$), LSF: (lanthanum strontium ferrite: (La, Sr)$FeO_3$), LSC: (lanthanum strontium cobaltite: (La, Sr)$CoO_3$), and LNF (lanthanum nickel ferrite: (La(Ni, Fe)$O_3$), or the like. The density of the main phase that is configured by a perovskite oxide may be configured as 5.5 $g/cm^3$ to 8.5 $g/cm^3$.

The occupied surface area ratio of the main phase in a cross section of the cathode 50 may be configured as greater than or equal to 89.5% and less than or equal to 99.5%. In the present embodiment, the term "occupied surface area ratio of the substance Z in the cross section" denotes the ratio of the sum total surface area of a substance Z phase relative to the total surface area of a solid phase in a cross section. The method of calculating the occupied surface area ratio will be described in detail below.

The cathode 50 includes a second phase that is configured by (Co, Fe)$_3O_4$ and $Co_3O_4$ that have a spinel crystalline structure. (Co, Fe)$_3O_4$ includes $Co_2FeO_4$, $Co_{1.5}Fe_{1.5}O_4$, and $CoFe_2O_4$, or the like. In the second phase, $Co_3O_4$ and (Co, Fe)$_3O_4$ are in a mixed configuration and not in a solid solution. More specifically, a feature such as "$Co_3O_4$ and (Co, Fe)$_3O_4$ are mixed" means a configuration in which an EDX spectrum detecting Co and O and an EDX spectrum detecting Co, Fe and O are separately acquired at different sites and $Co_3O_4$ and (Co, Fe)$_3O_4$ are literally mixed (=present in a combined state) (Kojien Second Edition, Corrected Version, 15 Oct. 1979, Fourth Publication)). The density of the second phase may be configured as 5.2 $g/cm^3$ to 6.2 $g/cm^3$. The density of the second phase is less than the density of the main phase.

The occupied surface area ratio of the second phase in a cross section of the cathode 50 is less than or equal to 10.5%. The occupied surface area ratio of the second phase is the sum of the occupied surface area ratio of $Co_3O_4$ and the occupied surface area ratio of (Co, Fe)$_3O_4$. More specifically, the occupied surface area ratio of the second phase includes the occupied surface area ratio of the particles that are configured by $Co_3O_4$, the occupied surface area ratio of the particles that are configured by (Co, Fe)$_3O_4$, the occupied surface area ratio of the particles that are configured by a mixture of $Co_3O_4$ and (Co, Fe)$_3O_4$ and the occupied surface area ratio of $Co_3O_4$ and/or (Co, Fe)$_3O_4$ that are mixed into the particles of the main phase.

Since the inactive portion of the cathode inner portion is reduced by a configuration in which the occupied surface area ratio of the second phase is less than or equal to 10.5%, it is possible to suppress a reduction in the output of the fuel cell 10 during power supply.

It is more preferred that the occupied surface area ratio of the second phase in a cross section of the cathode 50 is greater than or equal to 0.5%. In this manner, since the sintering characteristics of the cathode 50 are improved by suitably introducing the second phase, the porous framework structure can be strengthened. As a result, since changes in the microstructure of the cathode 50 can be inhibited, it is possible to suppress the production of cracks in the cathode 50 during power supply.

Although there is no particular limitation in relation to the ratio of the occupied surface area ratio of $Co_3O_4$ and the occupied surface area ratio of (Co, Fe)$_3O_4$ in the occupied surface area ratio of the second phase, a configuration in which (Co, Fe)$_3O_4$ is added in a greater amount than $Co_3O_4$ is effective for strengthening the framework structure of the cathode 50. For that purpose, the occupied surface area ratio of (Co, Fe)$_3O_4$ is preferably greater than the occupied surface area ratio of $Co_3O_4$. In such a configuration, the occupied surface area ratio of $Co_3O_4$ in a cross section of the cathode 50 may be configured as less than or equal to 2.5%, and the occupied surface area ratio of (Co, Fe)$_3O_4$ in a cross section of the cathode 50 may be configured as less than or equal to 9.5%.

Although there is no particular limitation in relation to the average equivalent circle diameter of the second phase in the cross section of the cathode 50, it is preferably greater than or equal to 0.05 µm and less than or equal to 0.5 µm. In this manner, it is possible to suppress a reduction in the output of the fuel cell 10 during power supply. The average equivalent circle diameter is the value of the arithmetic average of 50 randomly selected circle diameters that have the same surface area as the second phase. The 50 second phases that are the object of equivalent circle diameter measurement are preferably selected in a random manner from 5 or more positions on an FE-SEM image (magnification 10000 times) on a cross section of the cathode 50.

The cathode 50 may include a third phase as distinct from the main phase and second phase described above. The components that constitute the third phase may include for example CO (cobalt oxide), SrO (strontium oxide), $SrSO_4$ (strontium sulfate), and an oxide of an element that constitutes the main phase. However, there is no limitation in this regard. The sum total occupied surface area ratio of the third phase in the cross section of the cathode 50 is preferably less than 10%.

Method of Calculation of Occupied Surface Area Now, the method of calculation of the occupied surface area ratio of the second phase in a cross section of the cathode 50 will be described.

Firstly, a cross section of the cathode 50 is polished with precision machinery followed by an ion milling process performed using an IM4000 manufactured by Hitachi High-Technologies Corporation.

Then, an SEM image of a cross section of the cathode 50 that is enlarged with a magnification of 10,000 times is obtained by the use of a field emission scanning electron microscope (FE-SEM) that uses an in-lens secondary electron detector.

Next, 3 values corresponding to the contrast of the main phase, second phase and pores are assigned by categorizing the luminosity of the SEM image into 256 gradations. For example, the main phase is displayed as faint gray, the second phase as gray and the pores as black. However, there is no limitation in this regard.

Next, an analysis image highlighting $Co_3O_4$ and (Co, Fe)$_3O_4$ is obtained by image analysis of an SEM image using HALCON image analysis software produced by MVTec GmbH (Germany). The total surface area of $Co_3O_4$ and $(Co, Fe)_3O_4$ in the analysis image is taken to be the total surface area of the second phase, and the occupied surface area ratio of the second phase is calculated by dividing the total surface area of the second phase by the total surface area of the total solid phase in the analysis image. The analysis described above is performed at 5 positions on the same cross section of the cathode 50, and a value that is the arithmetic average of the ratio of the total surface area of the second phase calculated respectively at 5 positions is the occupied surface area ratio of the second phase in the cathode 50.

The respective occupied surface area ratio of $Co_3O_4$ and $(Co, Fe)_3O_4$ can be confirmed by component analysis as described below.

Firstly, the position of the second phase is confirmed with reference to the SEM image used in the calculation of the occupied surface area ratio of the second phase. Next, an EDX spectrum at the position of the second phase is obtained using energy dispersive X-ray spectroscopy (EDX). The elements that are present at the position of the second phase are identified by semi-quantitative analysis of the EDX spectrum. In this manner, it can be confirmed that $Co_3O_4$ and $(Co, Fe)_3O_4$ are in a mixed configuration in the second phase and not present in a solid solution, and that the occupied surface area ratio of $Co_3O_4$ and the occupied surface area ratio $(Co, Fe)_3O_4$ in the second phase can be separately obtained.

Whether $(Co, Fe)_3O_4$ is configured as any of $CoFe_2O_4$, $Co_{1.5}Fe_{1.5}O_4$ or $Co_2FeO_4$ can be confirmed by analysis of the crystalline structure of the second phase (lattice constant, lattice type, crystal orientation) using selected area electron diffraction (SAED) with a transmission electron microscope (TEM).

The calculation method of the occupied surface area ratio for the second phase has been described above, and the occupied surface area ratio for the main phase may be calculated in the same manner.

Cathode Material The cathode material used to configure the cathode 50 is a mixture in which a $Co_3O_4$ raw powder and a $(Co, Fe)_3O_4$ raw powder are added to a perovskite oxide raw powder that is expressed by the general formula $ABO_3$.

The composite perovskite oxide raw powder includes a raw powder such as LSCF, LSF, LSC, LNF, SSC, or the like. $(Co, Fe)_3O_4$ includes a raw powder of $Co_2FeO_4$, $Co_{1.5}Fe_{1.5}O_4$ or $CoFe_2O_4$, or the like.

The total added amount of the $Co_3O_4$ raw powder and $(Co, Fe)_3O_4$ raw powder that is added to the cathode material is less than or equal to 9.5 wt %. In this manner, it is possible to inhibit the occupied surface area ratio of the second phase in a cross section of the cathode 50 to less than or equal to 10.5%.

The total added amount of $Co_3O_4$ and $(Co, Fe)_3O_4$ in the cathode material is preferably greater than or equal to 0.46 wt %. In this manner, it is possible to control the occupied surface area ratio of the second phase in a cross section of the cathode 50 to greater than or equal to 0.5%.

The occupied surface area ratio of the second phase can be minutely adjusted by adjusting the granularity of each raw powder or the configuration of the $Co_3O_4$ raw powder and $(Co, Fe)_3O_4$ raw powder (whether in an oxide or chloride configuration, or the like).

Adjusting the granularity of the $Co_3O_4$ raw powder and the $(Co, Fe)_3O_4$ raw powder enables the adjustment of the average equivalent circle diameter of the second phase in a cross section of the cathode 50. Adjusting the granularity of the $Co_3O_4$ raw powder and the $(Co, Fe)_3O_4$ raw powder is preferably performed by the use of an air classifier. In this manner, accurate classification such as an upper limiting value and a lower limiting value for the grain diameter is possible.

Method of Manufacturing Fuel cell 10 Next, an example will be described of a manufacture method for the fuel cell 10. In the following description, the term "green body" denotes a member prior to firing.

Firstly, a slurry for the anode current collecting layer is prepared by adding a binder (for example polyvinyl alcohol) to a mixture of an anode current collecting layer powder (for example, an NiO powder and a YSZ powder) and a pore forming agent (for example, PMMA (polymethylmethacrylate resin)). Next, an anode current collecting layer powder is obtained by drying and granulating the slurry for the anode current collecting layer in a spray drier. Next, a green body for the anode current collecting layer 21 is formed by molding the anode powder using a die press molding method. At that time, a tape lamination method may be used in substitution for the die press molding method.

Next, a slurry for the anode active layer is prepared by adding a binder (for example polyvinyl alcohol) to a mixture of an anode active layer powder (for example, an NiO powder and a YSZ powder) and a pore forming agent (for example, PMMA). Then, a green body for the anode active layer 22 is formed by printing the slurry for the anode active layer onto the green body for the anode current collecting layer 21 using a printing method. In that manner, a green body for the anode 20 is formed. At that time, a tape lamination method or coating method or the like may be used in substitution for the printing method.

Next, a slurry for the solid electrolyte layer is prepared by mixing a mixture of water and a binder into a solid electrolyte layer powder (for example, a YSZ powder) in a ball mill. Then, a green body for the solid electrolyte layer 30 is formed by coating and drying the slurry for the solid electrolyte layer onto the green body for the anode 20. At that time, a tape lamination method or printing method or the like may be used in substitution for the coating method.

Next, a slurry for the barrier layer is prepared by mixing a mixture of water and a binder into a barrier layer powder (for example, a GDC powder) in a ball mill. Then, a green body for the barrier layer 40 is formed by coating and drying the slurry for the barrier layer onto the green body for the solid electrolyte layer 30. At that time, a tape lamination method or printing method or the like may be used in substitution for the coating method.

Next, a laminated body using the green bodies respectively for the anode 20, the solid electrolyte layer 30 and the barrier layer 40 are cofired at 1300 to 1600 degrees C. for 2 to 20 hours to form a cofired body of the anode 20, the solid electrolyte layer 30 and the barrier layer 40.

Next, a slurry for the cathode is prepared by mixing water and a binder with the cathode material described above in a ball mill. Next, a green body for the cathode 50 is formed by coating and drying the slurry for the cathode onto the barrier layer 40 of the cofired body. Then, the green body for the cathode 50 is fired (1000 to 1100 degrees C. for 1 to 10 hours) in an electrical furnace (oxygen-containing atmosphere) to thereby form the cathode 50 on the barrier layer 40.

Other Embodiments

Although an embodiment of the present invention has been described above, the present invention is not limited to the above embodiment, and various changes or modifications may be added within a scope that does not depart from the spirit of the invention.

Although a configuration has been described in which the cathode 50 according to the present invention is applied to the fuel cell 10, in addition to a fuel cell, the cathode of the present invention may be applied to an electrochemical cell having a solid oxide configuration that includes a solid oxide-type electrolytic cell.

In the present embodiment, although the fuel cell 10 comprises the anode 20, the solid electrolyte layer 30, the barrier layer 40 and the cathode 50, there is no limitation in this regard. The fuel cell 10 may comprise the anode 20, the solid electrolyte layer 30, and the cathode 50, or another layer may be interposed between the anode 20 and the solid electrolyte layer 30, or between the solid electrolyte layer 30 and the cathode 50.

Examples

Although the examples of a cell according to the present invention will be described below, the present invention is not thereby limited to the following examples.

Preparation of Samples No. 1 to No. 21

A fuel cell according to Samples No. 1 to No. 21 was prepared as described below.

Firstly, an anode current collecting layer (NiO:8YSZ=50:50 (Ni volume % conversion)) was formed with a thickness of 500 μm using a die press molding method, and on that layer, an anode active layer (NiO:8YSZ=45:55 (Ni volume % conversion)) was formed using a printing method with a thickness of 20 μm.

Then, green bodies for a GDC layer and an 8YSZ layer were sequentially formed using a coating method on the anode active layer and co-fired (1400 degrees C., 2 hours).

Next, as shown in Table 1, a cathode material was prepared that includes a main phase (LSCF, LSF or SSC) and a second phase ($Co_3O_4$ and $(Co, Fe)_3O_4$). As shown in Table 1, the occupied surface area ratio of the second phase in the cathode was varied by varying the addition amount of the second phase in each sample. Furthermore, the granularity of the $Co_3O_4$ raw powder and the $(Co, Fe)_3O_4$ raw powder was adjusted so that the average equivalent circle diameter of the second phase takes the values shown in Table 1. In Sample No. 1, No. 2, No. 11, and No. 12, $Co_2FeO_4$ was used as $(Co, Fe)_3O_4$, in Sample No. 3 to No. 5, No. 13, No. 14, and No. 17, $Co_{1.5}Fe_{1.5}O_4$ was used as $(Co, Fe)_3O_4$, and in Sample No. 6 to No. 10, No. 15, No. 16 and No. 18 to No. 21, $CoFe_2O_4$ was used as $(Co, Fe)_3O_4$.

Next, a cathode slurry was prepared by mixing the cathode material, water and PVA in a ball mill for 24 hours.

Next, after coating and drying the slurry for the cathode onto the GDC layer of the cofired body, a cathode was formed by firing for one hour in an electrical furnace (oxygen-containing atmosphere, 1000 degrees C.).

Measurement of Occupied Surface Area Ratio of Second Phase

Firstly, after polishing a cross section of the cathode in each sample with precision machinery, ion milling processing was performed using an IM4000 manufactured by Hitachi High-Technologies Corporation.

An SEM image of five positions in a cross section of the cathode enlarged with a magnification of 10,000 times was obtained by use of an FE-SEM that uses an in-lens secondary electron detector. The SEM image was obtained using an FE-SEM (model: ULTRA55 manufactured by Zeiss AG) with a working distance setting of 3 mm and an acceleration voltage of 1.5 kV. In the SEM image, 3 values were assigned in relation to the contrast of the main phase, the second phase and the pores by categorizing the luminosity of the image into 256 gradations.

Then, the SEM image was configured as an analysis image by use of HALCON image analysis software produced by MVTec GmbH (Germany) in order to obtain an analysis image that highlights $Co_3O_4$ and $(Co, Fe)_3O_4$.

Then, the occupied surface area ratio of the second phase was calculated respectively at five positions by dividing the total surface area of $Co_3O_4$ and $(Co, Fe)_3O_4$ in the analysis image by the total surface area of the solid phase in the analysis image and then calculating the arithmetic average of those values as the occupied surface area ratio for the second phase. Furthermore, an occupied surface area ratio of $Co_3O_4$ and an occupied surface area ratio of $(Co, Fe)_3O_4$ in the second phase were separately obtained by acquiring an EDX spectrum at the position of the second phase with reference to the SEM image. The calculation results for the occupied surface area ratio of the second phase in a cross section of the cathode are shown in Table 1.

Average Equivalent Circle Diameter of Second Phase

The average equivalent circle diameter of the second phase at 50 arbitrarily selected positions was calculated with reference to the 5 analysis images used in the calculation of the occupied surface area ratio. The calculation results for the average equivalent circle diameter of the second phase are shown in Table 1.

Measurement of Fuel Cell Output

While supplying nitrogen gas to the anode side and air to the cathode side of each sample, the temperature was increased to 750 degrees C. When reaching a temperature of 750 degrees C., hydrogen gas was supplied for 3 hours to the anode to perform a reduction process.

Next, a rated current density value of 0.2 A/cm$^2$ was set, and power generation for 1000 hours was performed while measuring the cell voltage. The voltage drop ratio per 1000 hours was calculated as a deterioration rate.

After 1000 hours of power generation, a cross section of the cathode was observed using an electron microscope to observe cracks in the cathode. Those samples that were observed to have cracks of less than or equal to 5 μm that have a slight effect on the characteristics of the fuel cell are designated in Table 1 as being "present (slightly)."

TABLE 1

| Sample | Main Phase of Cathode | Second Phase of Cathode | Occupied Surface Area Ratio of $Co_3O_4$ in Cross Section of Cathode (%) | Occupied Surface Area Ratio of $(Co, Fe)_3O_4$ in Cross Section of Cathode (%) | Average Equivalent Circle Diameter of Second Phase (μm) | Deterioration Rate (%) | Presence/ Absence of Microscopic Cracks | Evaluation |
|---|---|---|---|---|---|---|---|---|
| No. 1 | LSCF | $Co_2FeO_4 + Co_3O_4$ | 0.05 | 0.15 | 0.35 | 0.62 | present (slightly) | ◯ |
| No. 2 | LSCF | $Co_2FeO_4 + Co_3O_4$ | 0.08 | 0.52 | 0.25 | 0.35 | No | ◎ |
| No. 3 | LSCF | $Co_{1.5}Fe_{1.5}O_4 + Co_3O_4$ | 0.1 | 0.4 | 0.05 | 0.4 | No | ◎ |
| No. 4 | LSCF | $Co_{1.5}Fe_{1.5}O_4 + Co_3O_4$ | 0.3 | 1.2 | 0.22 | 0.47 | No | ◎ |

TABLE 1-continued

| Sample | Main Phase of Cathode | Second Phase of Cathode | Occupied Surface Area Ratio of $Co_3O_4$ in Cross Section of Cathode (%) | Occupied Surface Area Ratio of $(Co, Fe)_3O_4$ in Cross Section of Cathode (%) | Average Equivalent Circle Diameter of Second Phase (μm) | Deterioration Rate (%) | Presence/ Absence of Microscopic Cracks | Evaluation |
|---|---|---|---|---|---|---|---|---|
| No. 5 | LSCF | $Co_{1.5}Fe_{1.5}O_4 + Co_3O_4$ | 0.3 | 2.1 | 0.26 | 0.58 | No | ⊚ |
| No. 6 | LSCF | $CoFe_2O_4 + Co_3O_4$ | 0.6 | 4.7 | 0.28 | 0.76 | No | ⊚ |
| No. 7 | LSCF | $CoFe_2O_4 + Co_3O_4$ | 1.6 | 5.9 | 0.42 | 0.95 | No | ⊚ |
| No. 8 | LSCF | $CoFe_2O_4 + Co_3O_4$ | 1.8 | 7.9 | 0.50 | 1.1 | No | ⊚ |
| No. 9 | LSCF | $CoFe_2O_4 + Co_3O_4$ | 1.7 | 8.8 | 0.52 | 1.5 | No | ⊚ |
| No. 10 | LSCF | $CoFe_2O_4 + Co_3O_4$ | 1.8 | 9.5 | 0.93 | 2.6 | No | X |
| No. 11 | LSF | $CoFe_2O_4 + Co_3O_4$ | 0.05 | 0.2 | 0.37 | 0.39 | present (slightly) | ○ |
| No. 12 | LSF | $CoFe_2O_4 + Co_3O_4$ | 0.3 | 1.3 | 0.42 | 0.85 | No | ⊚ |
| No. 13 | LSF | $Co_{1.5}Fe_{1.5}O_4 + Co_3O_4$ | 0.6 | 2.9 | 0.48 | 1.4 | No | ⊚ |
| No. 14 | LSF | $Co_{1.5}Fe_{1.5}O_4 + Co_3O_4$ | 1.6 | 7.9 | 0.50 | 1.05 | No | ⊚ |
| No. 15 | LSF | $CoFe_2O_4 + Co_3O_4$ | 1.5 | 8.7 | 0.55 | 1.5 | No | ⊚ |
| No. 16 | LSF | $CoFe_2O_4 + Co_3O_4$ | 0.6 | 10.9 | 0.97 | 2.8 | No | X |
| No. 17 | SSC | $Co_{1.5}Fe_{1.5}O_4 + Co_3O_4$ | 0.1 | 0.3 | 0.17 | 0.45 | present (slightly) | ○ |
| No. 18 | SSC | $CoFe_2O_4 + Co_3O_4$ | 0.1 | 0.5 | 0.08 | 0.68 | No | ⊚ |
| No. 19 | SSC | $CoFe_2O_4 + Co_3O_4$ | 0.5 | 2.4 | 0.30 | 0.31 | No | ⊚ |
| No. 20 | SSC | $CoFe_2O_4 + Co_3O_4$ | 0.5 | 5.1 | 0.40 | 0.78 | No | ⊚ |
| No. 21 | SSC | $CoFe_2O_4 + Co_3O_4$ | 0.6 | 10.3 | 0.58 | 2.3 | No | X |

As shown in Table 1, a reduction in the output of the fuel cell was suppressed in Sample No. 1 to No. 9, No. 11 to No. 15, and No. 17 to No. 20 in which the occupied surface area ratio of the second phase in a cross section of the cathode was suppressed to less than or equal to 10.5%. This feature is due to the reduction in the inactive portion in an inner portion of the cathode.

In the present embodiment, the effect of the present invention was simply confirmed by preparing a cathode into which a second phase had been introduced and measuring a deterioration rate after 1000 hours power generation immediately after the manufacture of the fuel cell. However, the results of the present embodiment demonstrate that it is possible to suppress an output reduction of a fuel cell if the occupied surface area ratio of a second phase in a cross section of the cathode is suppressed to less than or equal to 10.5% irrespective of the manner of manufacturing or the degree to which the fuel cell is used.

Furthermore the production of cracks in the cathode was suppressed in Sample No. 2 to No. 10, No. 12 to No. 15, and No. 18 to No. 21 in which the occupied surface area ratio of the second phase in a cross section of the cathode was configured to be greater than or equal to 0.5%. This feature is due to the strengthening of the porous framework structure by improving the sintering characteristics of the cathode with the second phase.

The occupied surface area ratio of $(Co, Fe)_3O_4$ in those samples is generally greater than the occupied surface area ratio of $Co_3O_4$, and therefore such a feature exhibits a more useful effect in relation to strengthening of the framework structure of the cathode. However, even when the occupied surface area ratio of $(Co, Fe)_3O_4$ is smaller than the occupied surface area ratio of $Co_3O_4$, or even when it is the same, the framework structure of the cathode can be strengthened by a configuration in which the occupied surface area ratio of the second phase is greater than or equal to 0.5%.

In the present embodiment, the effect of the present invention was simply confirmed by preparing a cathode into which a second phase had been introduced and observing cracks after 1000 hours power generation immediately after manufacture of the fuel cell. However, the results of the present embodiment demonstrate that it is possible to suppress the production of cracks in a cathode if the occupied surface area ratio of the second phase in a cross section of the cathode is configured to be greater than or equal to 0.5% irrespective of the manner of manufacturing or the degree of to which the fuel cell is used.

In addition, in Sample No. 1 to No. 8, No. 11 to No. 14, and No. 17 to No. 20 in which the average equivalent circle diameter of the second phase in a cross section of the cathode was configured to be greater than or equal to 0.05 μm and less than or equal to 0.5 μm, a further suppression in a reduction of the fuel cell output was enabled.

The invention claimed is:

1. An electrochemical cell comprising
   an anode,
   a cathode, and
   a solid electrolyte layer disposed between the anode and the cathode,
   the cathode containing a main phase which is configured by a perovskite oxide expressed by the general formula $ABO_3$ that includes at least one of La or Sr at the A site and at least one of Fe, Co and Ni at the B site, and a second phase which is configured by $Co_3O_4$ and $(Co, Fe)_3O_4$,
   an occupied surface area ratio of the second phase in a cross section of the cathode being less than or equal to 10.5%, and
   an occupied surface area ratio of $(Co, Fe)_3O_4$ in a cross section of the cathode being greater than an occupied surface area ratio of $Co_3O_4$.

2. The electrochemical cell according to claim 1, wherein the occupied surface area ratio of the second phase in the cross section of the cathode is greater than or equal to 0.5%.

* * * * *